US008879739B2

(12) United States Patent
Bieber (10) Patent No.: US 8,879,739 B2
(45) Date of Patent: Nov. 4, 2014

(54) METHOD, SYSTEM AND DEVICE FOR SECURELY TRANSFERRING DIGITAL CONTENT BETWEEN ELECTRONIC DEVICES WITHIN A COMMUNICATION NETWORK MANAGED BY A MANAGEMENT CENTER

(71) Applicant: Nagravision S.A., Cheseaux-sur-Lausanne (CH)

(72) Inventor: Yann Bieber, Lausanne (CH)

(73) Assignee: Nagravision S.A., Cheseaux-sur-Lausanne (CH)

( * ) Notice: Subject to any disclaimer, the term of this patent is extended or adjusted under 35 U.S.C. 154(b) by 0 days.

(21) Appl. No.: 13/737,094

(22) Filed: Jan. 9, 2013

(65) Prior Publication Data
US 2014/0146966 A1  May 29, 2014

(30) Foreign Application Priority Data

Nov. 26, 2012  (EP) ..................... 12194223

(51) Int. Cl.
*H04L 9/12* (2006.01)
*H04L 9/08* (2006.01)
*H04L 29/12* (2006.01)

(52) U.S. Cl.
CPC ............... *H04L 9/08* (2013.01); *H01L 9/0833* (2013.01); *H04L 9/0822* (2013.01); *H04L 9/0869* (2013.01)
USPC .......................................... 380/283; 380/279

(58) Field of Classification Search
CPC combination set(s) only.
See application file for complete search history.

(56) References Cited

U.S. PATENT DOCUMENTS

| 6,363,154 | B1 | 3/2002 | Peyravian et al. | |
|---|---|---|---|---|
| 2006/0137015 | A1* | 6/2006 | Fahrny et al. | 726/26 |
| 2006/0184807 | A1* | 8/2006 | Kocher et al. | 713/194 |
| 2008/0263372 | A1* | 10/2008 | Sako et al. | 713/193 |
| 2008/0279385 | A1* | 11/2008 | Park et al. | 380/278 |
| 2008/0310628 | A1* | 12/2008 | Fujioka et al. | 380/201 |
| 2010/0250933 | A1 | 9/2010 | Kamio | |
| 2010/0250934 | A1* | 9/2010 | Watanabe et al. | 713/168 |
| 2010/0319017 | A1* | 12/2010 | Cook | 725/31 |

FOREIGN PATENT DOCUMENTS

EP          1 596 528       11/2005
WO     WO 2006/089101      8/2006

OTHER PUBLICATIONS

European Search Report dated May 2, 2013.

* cited by examiner

*Primary Examiner* — Venkat Perungavoor
(74) *Attorney, Agent, or Firm* — Harness, Dickey & Pierce, P.L.C.

(57) ABSTRACT

A method for securely transferring digital content between two electronic devices, comprising an activation phase performed by a management center for generating a common network key, calculating for each device an encrypted network key with a unique device key and transmitting to each device the encrypted network key and a unique device value involving said device key and a unique device secret value, a keys recovering performed by each device for obtaining the device key from both the device value and the secret value of said device and obtaining the network key from both the encrypted network key and the previously obtained device key, and an operating phase performed by each device for generating or obtaining a random value, generating a final key by encrypting the random value with the network key and using said final key for encrypting/decrypting said content.

20 Claims, 2 Drawing Sheets

METHOD, SYSTEM AND DEVICE FOR SECURELY TRANSFERRING DIGITAL CONTENT BETWEEN ELECTRONIC DEVICES WITHIN A COMMUNICATION NETWORK MANAGED BY A MANAGEMENT CENTER

PRIORITY STATEMENT

The present application hereby claims priority under 35 U.S.C. §119 to European patent application number EP 12194223.9 filed Nov. 26 2012, the entire contents of which are hereby incorporated herein by reference.

TECHNICAL FIELD

The present invention relates to the field of the transferring content between devices within a network managed by a management center, such as a home domain operator, acting as trusted entity to initiate or activate communications between devices. More specifically, the invention aims to share content securely between a sending device and at least one receiving device connected together within a wire or wireless network, after having performed an activation phase through a management center.

BACKGROUND ART

Sharing content securely between devices implies ciphering content with one or several ciphering keys, depending on the kind of cryptographic scheme. The use of one shared encryption/decryption key typically refers to a symmetric encryption scheme, whereas the asymmetric scheme implies the use of pairs of private and public keys for each device. The public key of the receiving device can be freely exchanged to any device and therefore can be used by a sending device to encrypt a message to be sent to the receiving device. The latter will use his corresponding private key to decrypt the message which cannot be decrypted by the other devices given that the process is not reversible, i.e. the encrypted message cannot be decrypted by using the public key of the sending device. This cryptographic scheme is based on algorithm implying mathematical problems which are easy to solve in a way, but which are very difficult in the reverse way. As shared key generation process, Diffie-Hellman method allows two parties to jointly establish a shared secret key over an insecure communication channel and then to use this key to encrypt subsequent communications according to a symmetric cryptographic scheme.

In general, keys can be perfectly secured when they are exchanged, outside of the devices, by means of secure network protocols and these keys can also be perfectly secured inside these devices, by hardware key paths. The problem occurs when linking both of these parts, i.e. at the interface between each of these devices and the network paths linking them. All communications between two devices or systems require that transferred data travel down though the sending system's network stack, across the physical layer, and then up through the receiving system's network stack. The traditional way of linking the secure network protocol and the hardware key path implies extracting the clear key from the network stack then injecting it in the hardware key path. This way of doing exposes the clear key used to perform cryptographic operations onto the content in the RAM memory of the device. Therefore, there is a risk that this key can be accessed within the device, before being injected in the hardware key path, by malicious person wanting to intercept the exchanged messages between two devices.

SUMMARY OF THE INVENTION

In order to solve the above-mentioned problem, the present invention aims to suggest a method for securely transferring content between devices within a network managed by a management center. The devices can be storing and communication means, set-top-boxes, gateways, television systems or any other of devices able to exchange data within a network. Such a network can be a local network (e.g. a home domain), a wide network such as Internet or any other kind of network suitable for connecting communication devices. Each device of the network is preloaded with a pre-initialized secret value pre-stored in a secure memory of a chip within the device. This is typically achieved during the manufacturing of the chips which are then implemented into the devices. Assigning a secret value to each chipset is generally performed by a personalization authority, so that nobody else knows this secret value.

The management center is used to initiate the communications of devices through the network by providing them with activation data which are then used by these devices for communicating each others. To this end, the management center has, for each of the devices of the network, a device key K and a device value V, which are personal data belonging to each device (i.e. unique to each device). These personal data have been previously transmitted to the management center by the personalization authority. The device value V is the result of a preliminary cryptographic operation made onto the device key K by means of the secret value S corresponding to the same device.

The method firstly comprises an activation phase (i.e. an initialization phase) for activating all the devices of the network wanting to send or mutually exchange a content CT, this method comprising the steps of:
  generating a network key KN,
  calculating, for each of said devices, an encrypted network key KN' which is the result of the encryption of the network key KN by means of the corresponding device key K,
  transmitting, to each of said devices, its device value V and its encrypted network key KN'.

Secondly, the method comprises a key recovering phase which is performed at each of the devices wanting to communicate with each others. This key recovering phase comprises the following two steps:
  performing a first cryptographic operation for obtaining the device key K from the received device value V and from the secret value S of said device,
  performing a second cryptographic operation for obtaining the network key KN from the received encrypted network key KN' and from the device key K.

Finally, the method comprises a transferring phase for transferring a content CT from a sending device to at least one receiving device. The transferring phase comprises the steps of:
  generating a random value RV at one of said devices acting as a sending device,
  performing, at the sending device, a third cryptographic operation for generating a content key Kc from said random value RV and from the network key KN,
  encrypting the content CT either with said content key Kc or with said random value RV, and respectively sending the encrypted content CT' either with the random value RV or with the content key Kc to at least one of said devices acting as a receiving device.

In other words, the two last steps could be also formulated by two alternatives as follows:

encrypting the content CT with said content key Kc, then sending the encrypted content CT' and the random value RV to at least one of said devices acting as a receiving device, or encrypting the content CT with said random value RV, then sending the encrypted content CT' and the content key Kc to at least one of said devices acting as a receiving device.

According to an embodiment of the invention, the method further comprises the steps of:

performing, at the receiving device, the same third cryptographic operation for generating the content key Kc from the received random value RV and from the network key KN, decrypting, at the receiving device, the encrypted content CT' by means of the content key Kc.

According to a preferred embodiment of the present invention, the device value V, assigned to each device, is stored upon receipt into a secure memory of the device. Advantageously, this secure memory is located within a monolithic chip which performs all the cryptographic operations at the device. Thus the encryption/decryption of the content and the first, second and third cryptographic operations are performed within a single chip, i.e. a monolithic chip, in each device. According to the present method, any data entering into this chip (or going out of this chip) is not sufficient for decrypting a content encrypted by this chip. Therefore, any piracy of the communications going in and out of this chip does not allow a malicious person to descramble the contents encrypted by a sending device in accordance with the present method. Indeed, the key which protects the content never appears in clear, neither in the RAM of one the devices, nor through the network.

Moreover, the present method allows to encrypt/decrypt the content with a single content key, namely according to a symmetric encryption/decryption scheme. Accordingly, this method provides a fast and efficient cryptographic process that saves both time and computing resources to all devices of the network.

Advantageously, the content and the cryptographic data (cryptographic "material") exchanged between the devices of the network does not transit through the management center, but is directly sent from the sending device to the recipients. Other advantages and embodiments will be presented in the following detailed description.

The present invention also suggests a system for transferring content between devices within a network managed by a management center. It further suggests a device for exchanging content with other identical devices within a network managed by a management center.

BRIEF DESCRIPTION OF THE DRAWINGS

The present invention will be better understood thanks to the attached figures in which.

DETAILED DESCRIPTION

Figure 1:
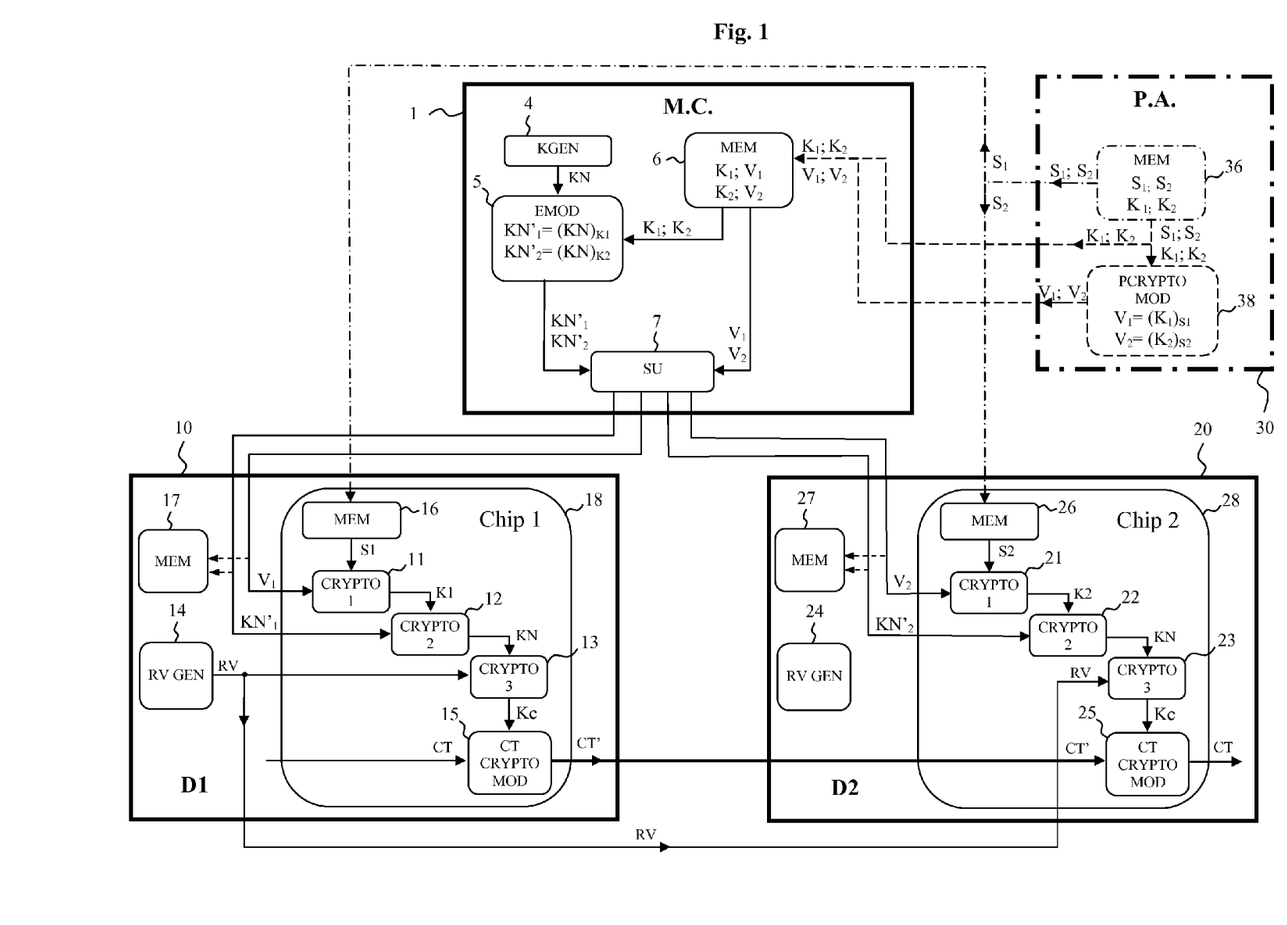
FIG. 1 is a bloc diagram showing the main players of the method of the present invention and the main operations performed within each of them in order to initiate data transmitting and to securely exchange content between the devices of the network, FIG. 2 refers to a variant of FIG. 1 which depicts only the differences with respect to FIG. 1, so that the elements which do not differ from FIG. 1 have not been shown for the sake of simplification.

Reference will now be made in detail to the preferred embodiment of the invention as illustrated in FIG. 1. In the interest of simplification, only two devices have been shown in this figure, however, one will understood that the method of the present invention is obviously not limited to two devices, but it may imply many devices.

This figure firstly shows a management center 1 and two devices 10, 20 which are intended to exchange a content CT between them. In this example, the first device acts as sending device 10 and the second acts as receiving device 20. The two devices 10, 20 are linked together by means of a network illustrated by arrows drawn between them. The management center 1 can be part of this network or it can be linked to the devices through another network. Preferably, the same network, e.g. Internet, allows the interconnection of both the management center 1 and the devices 10, 20 involved in the method of the invention.

During manufacturing of chips located in the devices, a personalization authority 30 has stored a secret value S in the memory of each of these chips, in particular in a secured non volatile memory. This secret value is unique for each device and is identified respectively by S1, S2 in FIG. 1 and this operation is shown by the dot and dash lines in this Figure. As this operation is performed during manufacturing of the chip by a trust authority, the secret value S assigned to each device can be regarded as being implemented in a fully secret and secure manner. In a similar way, the device key K and the device value V, pertaining to each device 10, 20, are determined by the personalization authority and implemented in the memory of the management center during its deployment. This operation is shown in FIG. 1 by the dashed lines. The device value V assigned to each device is the result of a preliminary cryptographic operation of the device key K by means of the secret value S. This is shown in this figure by the expressions $V1=(K1)S1$; $V2=(K2)S2$ noted in the preliminary cryptographic module 38 of the personalization authority which is responsible for determining the device value V, the device key K and the secret value S for each device. Each device key K and each device value V pertaining to the same device can also be stored in record assigned to this device and stored in the memory 36 of the personalization authority 30.

From this configuration, the method firstly comprises an activation phase during which the management center interacts with the devices, in particular with new devices forming or joining the network in view to send or mutually exchange data (content CT). Then, this method refers to an operating phase during which contents CT (i.e. data or messages) are exchanged between specific devices without any interaction from the management center. This operating phase preferably includes a keys recovering phase which will be explained hereafter.

The management center 1 comprises a memory 6 storing, for each device 10, 20 of the network, at least one device key K and one value V. As shown in this figure, the device key K1 and the device value V1 pertain to the first device 10, whereas the second device key K2 and the second device value V2 are reserved for the second device 20. Therefore, in a network comprising n devices, the memory 6 stores the device keys K1, K2, . . . , Kn and the device values V1, V2, . . . , Vn. In the present description and for the sake of clarity, the index number 1, 2, . . . , n associated to the alphabetic letters always refers to the device designated by the same index (thus, index number 1 refers to the first device, the index number 2 refers to the second device, etc. . . . ).

During the initialization of the network, namely during the activation of its devices, the management center 1 generates a network key KN by means of a key generator 4. The network key KN is a common key which will be used by all the devices and which is preferably generated randomly. However, this network key is never transmitted in plain text through the network. Within the management center, the network key KN is input into an encryption module 5 in order to calculate, for each device 10, 20, an encrypted network key KN'. The encrypted network key KN' is determined by the algorithm of the encryption module 5 which requires, as additional input, the device key K. For instance, the encrypted key KN'1, which refers to the first device 10, is calculated by encrypting the common network key KN by means of the device key K1 assigned to the first device. Any kind of algorithm can be used by the encryption module 5 for generating the encrypted network keys KN'n. As shown in FIG. 1, the management center has also device values V stored in its memory 6. For instance, the device key K1 and the device value V1 can be stored together in a single record assigned to the first device 10. Alternatively, they can be stored separately if they are each identified e.g. by an index n used for designating the same unique device. In any cases, the device key K and the device value V refer to personal data which are preferably both unique for each device.

The network Key KN' and the corresponding device value V correspond to so-called activation data. Each encrypted network key KN' and each device value V is then transmitted from the management center to the corresponding device 10, 20 by means of a sending unit 7 through a suitable interface. For instance, the encrypted network key KN'1 and the device value V1 can be sent, either together in a single activation message (packet or record) to the device 10, or they can be sent separately without specific order. The electronic addresses used to route these data to the appropriate devices can be managed either by the management center itself or by a third unit within the network. As shown in FIG. 1, the components 4, 5, 6, and 7 belong to the management center 1.

Referring now more specifically to the device 10, the latter acts as sending device and has to send securely the content CT to the second device 20, as depicted in the example of FIG. 1. To this end, the sending device 10 needs several components, in particular a first cryptographic module 11, a second cryptographic module 12, a third cryptographic module 13, a random value generator 14, a content cryptographic module 15 and a memory 16. All these components, excepting the random value generator 14, are included in a single chip 18. Alternatively, the random value generator 14 could be also located inside the chip 18. This chip 18 is provided with a communication interface allowing receiving data, in particular at least the device value V and the encrypted network key KN', preferably also a random value RV generated by the generator 14 (in the case where the latter is located outside the chip 18). This communication interface can also be used to send the content, once it has been encrypted, to at least one recipient. This interface can further be used to send other data such as a random value, in the case where the random value generator 14 is located inside the chip 18. As shown in FIG. 1, each device 10, 20 of the network can advantageously comprise the same components as those described in reference with the first device 10.

According to a preferred embodiment, the device value V and the encrypted network key KN' (received e.g. within an activation message) are stored within a non-volatile memory 17 associated to the de device 10 for later use. As shown in FIG. 1, such a non-volatile memory 17 is not necessarily a secured memory and it could therefore be located outside the chip 18, for instance within the device 10. Nevertheless, it is advantageous to place the non-volatile memory 17 inside the chip 18, so that it can be protected by the chipset. Once the activation data (V, KN') have been received by the device 10, 20, the activation phase is ended and the following phase refers to a keys recovering phase (aiming to successively recover the device key K and the network key KN as described hereunder).

On receipt by the device 10, the device value V can also be directly input into the first cryptographic module 11, together with the secret value S retrieved from this memory 16. Owing to its algorithm and to these two inputs V, S, the first cryptographic module 11 can derive the device key K pertaining to the sending device 10. Indeed, since the device value V is the result of the preliminary cryptographic operation of the device key K by means of the secret value S, namely V=(K)S, therefore by using a reverse algorithm in the first cryptographic module 11, the device key K can be determined from the device value V and the secret value S. Then, the encrypted network key KN' is input together with the device key K into the second cryptographic module 12 which performs the reverse cryptographic operation as that made by the encryption module 5 of the management center 1. Accordingly, the network key KN can be recovered. The network key KN is preferably not memorized within the chip of the devices (e.g. into a secured memory) but it is determined whenever necessary on the basis of activation data (V, KN') which are preferably memorized within each device, once received from the management center.

Once the network key KN is determined and known by the device 10, the keys recovering phase is ended. The network key KN, which is common to all devices 10, 20 of the network, can be determined in the same manner by each of them and it can be used many times without requiring any change. This means that the same activation and keys recovering steps have been performed with the other device(s) 20 so that all the devices 10, 20 of the network have the same network key KN.

In variant, the network key KN could be stored in a secured memory within the chip of the device for later use. However, according to the preferred embodiment the network key KN is never stored and must be determined by means of the activation data (V, KN') whenever necessary, namely at each time a content CT, CT' must be processed. This can be easily done if the activation data have been memorized in the non-volatile memory 17 upon their receipt from the management center.

The next steps refer to the transferring phase during which the transfer of a content CT is performed. To this end, the sending device 10 generates, by means of its random value generator 14, a random value RV which is input into the third cryptographic module 13, together with the network key KN. Owing to the algorithm implemented in the third cryptographic module, a content key Kc is determined from the two inputs RV and KN, more particularly by using the random value RV as a key for encrypting the network key KN. The last module of the chip 18 is the content cryptographic module 15 which encrypts a content CT by means of the content key Kc (and of course by means the encryption algorithm implemented into the content cryptographic module 15). At the output of this last module, the encrypted content CT' is then transmitted to the appropriate recipient by means of a common routing process (e.g. involving the electronic address of the receiving device 20). The random value RV provided by the random value generator 14 is also sent to this recipient 20, either separately from the encrypted content CT', or together within a common message. The chip 18, and/or the device 10 can use the same communication interface for receiving and sending data.

According to a variant, named "CT transfer variant", the content cryptographic module 15 could encrypt the content CT by means of the random value RV (instead of using the content key Kc). Then, instead of sending the random value RV to the recipient 20, the sending device 10 sends the content key Kc to the recipient 20. This case is shown in the left part of FIG. 2 which depicts said "CT transfer variant", in particular only what is different with respect to the preferred solution illustrated in FIG. 1.

By returning to FIG. 1, the operating phase can further comprise the steps of receiving the encrypted content CT' and the random value RV by the receiving device 20, more particularly by the single chip 28 of this device. The random value RV is input with the network key KN, determined by the receiving device 20, into the third cryptographic module 23 of this second device. This module performs the same cryptographic operation as that made by the third cryptographic module 13 of the first device 10. Accordingly, the receiving device 20 is able to generate the same content key Kc as that of the first device given that the network key KN is identical for all the devices. By using its own content cryptographic module 25, provided with the same encryption/decryption reversible algorithm as that implemented in the module 15 of the sending device 10, the receiving device 20 is finally able to decrypt the encrypted content CT' by means of the content key Kc as shown in FIG. 1.

Figure 2:
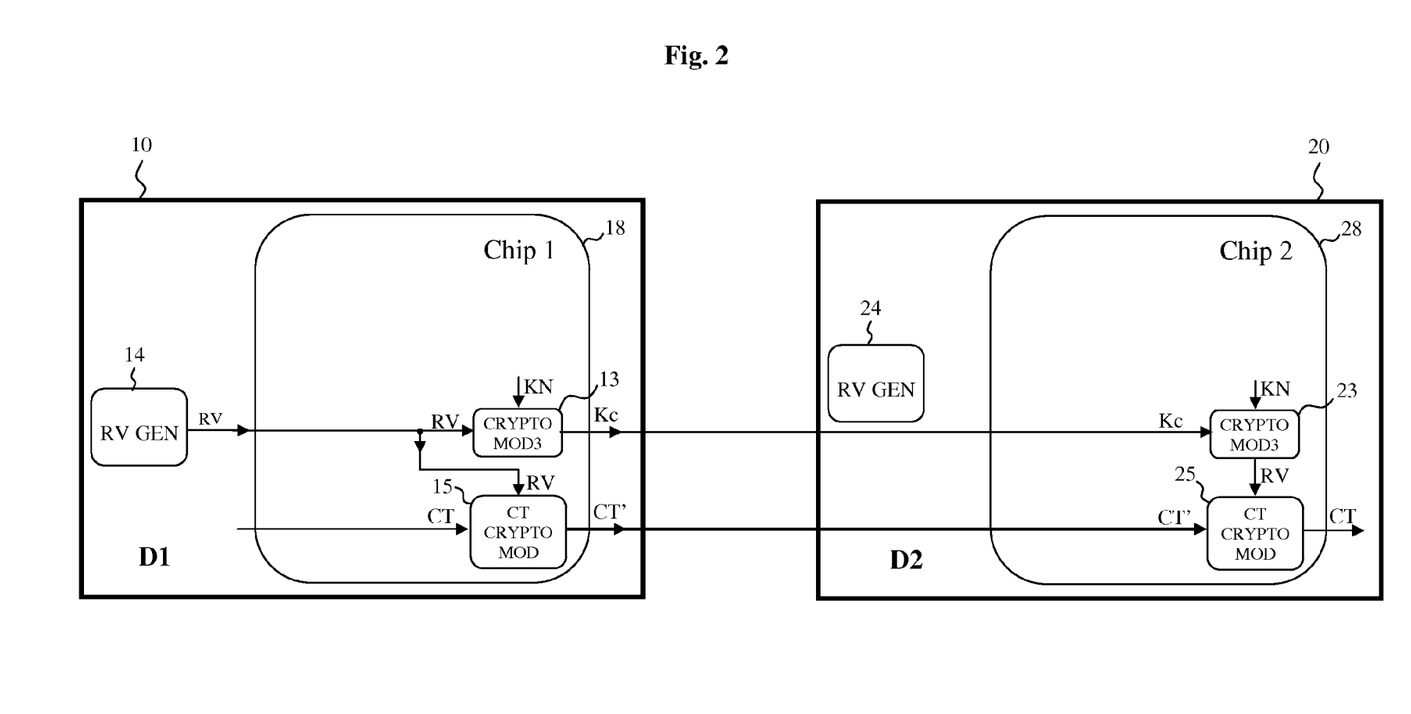

As an alternative and according to the aforementioned "CT transfer variant" shown in FIG. 2 (in particular now with the right part of this figure), the operating phase can rather further comprise the steps of receiving the encrypted content CT' and the content key Kc by the receiving device 20, more particularly by the single chip 28 of this device. The content key Kc is input with the network key KN, determined by the receiving device 20, into the third cryptographic module 23 of this second device. This module performs a similar cryptographic operation as that made by the third cryptographic module 13 of the first device 10. Accordingly, the receiving device 20 is able to generate the same random value RV as that of the first device given that the network key KN is identical for all the devices. By using its own content cryptographic module 25, provided with the same encryption/decryption reversible algorithm as that implemented in the module 15 of the sending device 10, the receiving device 20 is finally able to decrypt the encrypted content CT' by means of the random value RV.

In accordance to the so-called "CT transfer variant" shown in FIG. 2, it should be noted that both third cryptographic modules 13 and 23 involve the same values, namely KN, RV and Kc. According to the cryptographic module 13 the input value is RV and it allows to obtain Kc by means of the key KN, whereas according to the cryptographic module 23 the input value is Kc and it allows to obtain RV by means of the same key KN.

In order to generalize the two possible ways (i.e. the first disclosed way and its so-called "CT transfer variant"), one can mention that the operating phase can further comprise the steps of:

obtaining a final decryption key by performing, at the receiving device, the same or a similar third cryptographic operation 23 involving the network key KN, the random value RV and the content key Kc, then decrypting, at the receiving device, the encrypted content CT' by means of the final decryption key.

Depending on the data, namely Kc or RV, chosen for encrypting the content CT into the encrypted content CT', the aforementioned final decryption key can respectively be either the content key Kc or the random value RV.

As shown in FIG. 1 and according to another embodiment, the encrypted content CT' and the random value RV can be stored in the non-volatile memory 27, upon receipt by the receiving device 20. If necessary, for instance in the case where the activation data could change, the device value V and the encrypted network key KN' are also saved, e.g. in the non-volatile memory, either at the receiving device 20, or at the sending device or at both devices. In case where the encrypted content CT' refers to important data, it could be appropriate to save it together with the random value RV, still preferably with the corresponding activation data V, KN', in at least two devices 10, 20.

Preferably, the first, second and third cryptographic modules 11, 12, 13 and 21, 22, 23 of the same chip 18, 28 use different algorithms each others. However, the same algorithm can be used in several cryptographic modules of the same chip. Nevertheless, it is necessary that the third cryptographic modules 13, 23 of the respective chips 18, 28 use both the same cryptographic algorithm to ensure a correct mutual encryption/decryption of the content. Similarly, the first cryptographic module and the second cryptographic (of any chip) must use the same cryptographic algorithm(s) as that (those) used respectively by the preliminary cryptographic module 38 and by the encryption module 5.

This is the end of the operating phase which can be repeated each time a content must be sent from one device to at least one another device within the same network (i.e. one device could send the same encrypted content CT—together with the same random value RV—to a plurality of activated devices). The same encrypted content CT' and the corresponding encrypted random value RV' can be shared to any device of the home network which performed the same activation phase.

Moreover and according to a particular embodiment, it could be also possible that the device 10 acts both as a sending device and as a receiving device by sending to itself an encrypted content CT'. Such a manner could be used for locally storing an encrypted content CT' (in the present example within the device 1) while knowing that this encrypted content may be decrypted in the future for later use. To this end, the encrypted content CT' and the relevant random value RV (or the content key Kc in accordance to the "CT transfer variant") can be stored in any memory within the environment of the device 10, for instance in a memory located outside of the chip 18 such as the non-volatile memory 17 or in an external storage means (e.g. CD, DVD, USB-storage means) connectable to the device 10. If any activation data V1, KN'1 is liable to be changed before the encrypted content CT' is decrypted, then the activation data will be also stored in this non-volatile memory 17 (or in said external storage means). In variant, instead of storing the activation data V1 and KN'1, the network key KN could be stored in a secured memory within the chip 18. In any cases, the device 10 has in any time all the required data for retrieving the content key Kc in view to decrypt the stored encrypted content CT'.

According to the present invention, the encrypted content CT' and the relevant random value RV could be used as data that have to be saved, either locally within the same device that had encrypted them, or within another device (e.g. the device 20) which is separate (or at least distinct) from the first device (device 10). Such a situation could be useful, e.g. for recovering data recorded onto a first device which became defective if this data was previously sent as backup copy to a second device. As an example, if the chip 18 of the first device 10 becomes unusable, for any reason, and that its data (or data stored elsewhere in the device 10) was previously sent to a second device 20 in an encrypted form (CT') with the relevant random value RV, then a new device 10 (obtained in replacement of the previous one) can easily recover the stored data (after having performed the activation phase) by asking the second device 20 to sent back the encrypted content CT' and the corresponding random value RV (if necessary, together with the corresponding activation data V, KN', without excluding sending the network key KN directly, even if such a scenario is less recommended).

Advantageously, the network key KN is a key which is common to each device 10, 20, but which has never been exposed outside the chip 18, 28 of these devices. Besides, outside the chips, the encrypted network keys KN'1, KN'2 appear as being different from each other. More advantageously, all the values Vn, KN'n, RV passing both through the network and through each device 10, 20 do not allow, on their own, to decrypt the encrypted content CT'. Accordingly, any piracy of these data by a malicious person, even within the device 10, 20 or at the interface between this device and the network, will have no effect onto the security of the exchanged content.

Moreover, thanks to the three successive cryptographic operations performed by the three cryptographic modules 11, 12, 13, the content key Kc is determined on the basis of two keys K1, KN which are determined either directly or indirectly from the secret value S. Advantageously, this way of doing allow to keep the secret value S inaccessible for the management center, thus avoiding any risk of sensible data leakage that could corrupt the security of the system.

Besides, the memories 16, 26 of the chips 18, 28 each refer to a secure memory into which it is only possible to write only very few data and very seldom. This physical constraint of this memory built into the chip allows to write once root data (i.e. the secret value S), and then to dynamically enter into the chip, several keys assigned to different entities of the system.

Still advantageously, the network key KN can be easily renewed by the management center and therefore the method of the present invention is not a static method but can easily change over time.

Preferably, the device keys K (k1, K2, ... Kn) are generated by the key generator 4 of the management center 1. However, another similar key generator could be also used for this purpose.

The present invention also refers to system for transferring a content CT between devices 10, 20 within a network managed by the management center 1. The management center 1 comprising:
 the memory 6 for storing, for each device 10, 20, the device key K and the device value V; said device value V being the result of a preliminary cryptographic operation using said device key K as input data encrypted by means of the secret value S relevant to the device 10, 20; the device key K and the device value V are preferably stored together within record assigned to the relevant device; besides, since the data stored in the memory 6 are sensible data, the memory 6 is preferably a secure memory for protecting such data against any piracy attempt; the secret value S, the device key K and the device value V being unique to each of said devices,
 the key generator 4 for generating the network key KN,
 the encryption module 5 for determining, for each device 10, 20, the encrypted network key KN' which is the result of the encryption of the network key KN by means of the corresponding device key K, i.e. the device key K which pertains to the relevant device 10, 20,
 the sending unit 7 for transmitting to each device 10, 20 its device value V and its encrypted network key KN', i.e. the device value V and the encrypted network key KN' which pertain to the relevant device,
 each of these devices 10, 20 comprising:
 at least one input/output interface for receiving and sending data,
 the secure memory 16, 26 for storing the pre-initialized secret value S;
 this memory being typically a read-only memory,
 the first cryptographic module 11, 21 using the device value V and the secret value S relevant to this device 10, 20 as input of a first cryptographic algorithm for generating the device key K,
 the second cryptographic module 12, 22 using the encrypted network key KN' and the device key K relevant to this device 10, 20 as input of a second cryptographic algorithm for generating the network key KN,
 the random value generator 14, 24 for generating a random value RV when said device acts as sending device 10 for transferring the content CT to at least one other device 20 of the network,
 the third cryptographic module 13, 23 using the random value RV and the network key KN as input of the third cryptographic algorithm for generating the content key Kc,
 the content cryptographic module 15, 25 using the content key Kc and the content CT, CT' as input of the content cryptographic algorithm for generating either the encrypted content CT' from the plain text content CT or the plain text content CT from the encrypted content CT' depending on whether the device acts as sending device or as receiving device.

In order to be also compliant with the so-called "CT transfer variant" (FIG. 2), the above-mentioned third cryptographic module 13, 23 and the above-mentioned content cryptographic module 15, 25 could be defined by other words, so that the system of the present invention comprises either
 a third cryptographic module 13, 23 using the random value RV and the network key KN as input of a third cryptographic algorithm for generating a content key Kc; and a content cryptographic module 15, 25 using said content key Kc and a content CT, CT' as input of a content cryptographic algorithm for generating either an encrypted content CT' from a plain text content CT or a plain text content CT from an encrypted content CT',
 or
 a third cryptographic module 13, 23 involving the random value RV, the network key KN and the content key Kc to obtain a final cryptographic key by means of a third cryptographic algorithm; and a content cryptographic module 15, 25 using this final cryptographic key and a content CT, CT' as input of a content cryptographic algorithm for generating either an encrypted content CT' from a plain text content CT or a plain text content CT from an encrypted content CT'.

According to a particular embodiment of this system, the secure memory 16 or 26, the first cryptographic module 11 or 21, the second cryptographic module 12 or 22, the third cryptographic module 13 or 23 and the content cryptographic module 15 or 25 are included within a single chip 18 or 28 (i.e. a monolithic chip) located in the device 10 or 20.

According to another embodiment, each device 10, 20 further comprises a non-volatile memory 17. This memory 17 can be used for storing activation data V, KN' and/or the random value RV referring to a certain encrypted content CT'. Depending on the available size of this non-volatile memory 17, this encrypted content CT' could be also stored in this non-volatile memory or it can be stored into an appropriate separate storage means.

The present invention finally also refers to a device for exchanging content CT with other identical devices 10, 20, within the network managed by the management center 1. This device comprises:

- at least one input/output interface for receiving and sending data,
- the secure memory 16, 26 for storing the pre-initialized secret value S, this memory being typically a read-only memory,
- the first cryptographic module 11, 21 using the device value V received from the management center 1 and the secret value S (assigned and unique to this device) as input of a first cryptographic algorithm for generating the device key K known by said management center 1; said device value V and device key K being unique to the device,
- the second cryptographic module 12, 22 using on the one hand the encrypted network key KN' received from the management center 1, and on the other hand the device key K pertaining to this device as input of the second cryptographic algorithm for generating the network key KN known by said management center 1,
- the random value generator 14 for generating a random value RV, in particular when this device 10, 20 acts as a sending device 10 to transfer the content CT to at least one of the other devices of the network,
- the third cryptographic module 13, 23 using the random value RV and the network key KN as input of the third cryptographic algorithm for generating the content key Kc,
- the content cryptographic module 15, 25 using the content key Kc and the content CT, CT' as input of a content cryptographic algorithm for generating either an encrypted content CT' from a plain text content CT or a plain text content CT from an encrypted content CT' depending on whether the device acts as sending device or as receiving device.

In order to be also compliant with the so-called "CT transfer variant" (FIG. 2), the above-mentioned third cryptographic module 13, 23 and the above-mentioned content cryptographic module 15, 25 could be defined by other words, so that the system of the present invention comprises either

- a third cryptographic module 13, 23 using the random value RV and the network key KN as input of a third cryptographic algorithm for generating a content key Kc; and a content cryptographic module 15, 25 using said content key Kc and a content CT, CT' as input of a content cryptographic algorithm for generating either an encrypted content CT' from a plain text content CT or a plain text content CT from an encrypted content CT', or
- a third cryptographic module 13, 23 involving the random value RV, the network key KN and the content key Kc to obtain a final cryptographic key by means of a third cryptographic algorithm; and a content cryptographic module 15, 25 using this final cryptographic key and a content CT, CT' as input of a content cryptographic algorithm for generating either an encrypted content CT' from a plain text content CT or a plain text content CT from an encrypted content CT'.

According to a particular embodiment, the secure memory 16 or 26, the first cryptographic module 11 or 21, the second cryptographic module 12 or 22, the third cryptographic module 13 or 23 and the content cryptographic module 15 or 25 are included within a single chip 18 or 28 (i.e. a monolithic chip) located in the device 10 or 20.

According to another embodiment, each device 10, 20 further comprises a non-volatile memory 17. This memory 17 can be used for storing activation data V, KN' and/or the random value RV referring to a certain encrypted content CT'. Depending on the available size of this non-volatile memory 17, this encrypted content CT' could be also stored in this non-volatile memory.

The patent claims filed with the application are formulation proposals without prejudice for obtaining more extensive patent protection. The applicant reserves the right to claim even further combinations of features previously disclosed only in the description and/or drawings.

The example embodiment or each example embodiment should not be understood as a restriction of the invention. Rather, numerous variations and modifications are possible in the context of the present disclosure, in particular those variants and combinations which can be inferred by the person skilled in the art with regard to achieving the object for example by combination or modification of individual features or elements or method steps that are described in connection with the general or specific part of the description and are contained in the claims and/or the drawings, and, by way of combinable features, lead to a new subject matter or to new method steps or sequences of method steps, including insofar as they concern production, testing and operating methods.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

Further, elements and/or features of different example embodiments may be combined with each other and/or substituted for each other within the scope of this disclosure and appended claims.

Still further, any one of the above-described and other example features of the present invention may be embodied in the form of an apparatus, method, system, computer program, tangible computer readable medium and tangible computer program product. For example, of the aforementioned methods may be embodied in the form of a system or device, including, but not limited to, any of the structure for performing the methodology illustrated in the drawings.

Even further, any of the aforementioned methods may be embodied in the form of a program. The program may be stored on a tangible computer readable medium and is adapted to perform any one of the aforementioned methods when run on a computer device (a device including a processor). Thus, the tangible storage medium or tangible computer readable medium, is adapted to store information and is adapted to interact with a data processing facility or computer device to execute the program of any of the above mentioned embodiments and/or to perform the method of any of the above mentioned embodiments.

The tangible computer readable medium or tangible storage medium may be a built-in medium installed inside a computer device main body or a removable tangible medium arranged so that it can be separated from the computer device main body. Examples of the built-in tangible medium include, but are not limited to, rewriteable non-volatile memories, such as ROMs and flash memories, and hard disks. Examples of the removable tangible medium include, but are not limited to, optical storage media such as CD-ROMs and DVDs; magneto-optical storage media, such as MOs; magnetism storage media, including but not limited to floppy disks (trademark), cassette tapes, and removable hard disks; media with a built-in rewriteable non-volatile memory, including but not limited to memory cards; and media with a built-in ROM, including but not limited to ROM cassettes; etc. Furthermore, various information regarding stored images, for example, property information, may be stored in any other form, or it may be provided in other ways.

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

The invention claimed is:

1. A method for securely transferring a digital content CT between electronic devices within a network managed by a management center, each device comprising a pre-initialized unique secret value S,
   an activation phase performed by the management center and including the steps of,
      generating a network key KN common to all of said devices,
      calculating, an encrypted network key KN' personalized for each device by encrypting said network key KN using a personal device key K which is different for each device,
      transmitting to each of said devices the encrypted network key KN' and a device value V resulting from a preliminary cryptographic operation encrypting the device key K belonging to said device using the secret value S of said device,
   a keys recovering phase performed by each of said devices and including the steps of,
      performing a first cryptographic operation for obtaining the device key K from both the device value V and the secret value S of said device,
      performing a second cryptographic operation for obtaining the network key KN from both the encrypted network key KN' and the device key K,
   an operating phase including the steps of,
      generating a random value RV at one of said devices acting as a sending device,
      performing, at the sending device, a third cryptographic operation for generating a content key Kc by encrypting said random value RV using the network key KN, and executing at least one of the following steps,
         encrypting the content CT using said content key Kc to obtain an encrypted content CT', then sending the encrypted content CT' and the random value RV to at least one of said devices acting as a receiving device,
      or
         encrypting the content CT using said random value RV to obtain an encrypted content CT', then sending the encrypted content CT' and the content key Kc to at least one of said devices acting as a receiving device.

2. The method of claim 1, wherein said secret value S is implemented in a secure memory, located within a chip of the device, by a personalization authority.

3. The method of claim 2, wherein said preliminary cryptographic operation is performed by the personalization authority.

4. The method of claim 1, wherein the first, second and third cryptographic operations are performed with the encryption or decryption of the content CT within a single chip in the device.

5. The method of claim 1, wherein the random value RV or the content key Kc, when used as an encryption key of the content CT, are stored in a non-volatile memory associated with the receiving device and with the sending device.

6. The method of claim 5, wherein the device value V and the encrypted network key KN' are stored in said non-volatile memory.

7. The method of claim 1, further comprising the steps of:
   decrypting, at the receiving device, the encrypted content CT' respectively by performing at least one of,
      said third cryptographic operation for obtaining the content key Kc used as decryption key, and
      retrieving said random value RV from both the network key KN and the received content key Kc and using said random value RV as decryption key.

8. A system for securely transferring a digital content CT between electronic devices within a network comprising:
   a management center including,
      a memory for storing, for each device, a device key K and a device value V, said device value V resulting from a preliminary cryptographic operation encrypting said device key K using a secret value S relevant to said device, said secret value S, device key K and device value V being unique to each device,
      a key generator for generating a network key KN,
      an encryption module for determining, for each device, an encrypted network key KN' resulting from the encryption of the network key KN using the device key K relevant to said device,
      a sending unit for transmitting to each device its device value V and its encrypted network key KN';
   and the devices, each of said devices including,
      at least one input/output interface for receiving and sending data,
      a secure memory for storing said pre-initialized secret value S,
      a first cryptographic module using the device value V and the secret value S relevant to said device for generating the device key K,
      a second cryptographic module using the encrypted network key KN' and the device key K relevant to said device for generating the network key KN,
   each of said devices acting as a sending device further including,
      a random value generator for generating a random value RV,
      a third cryptographic module for generating a content key Kc by encrypting said random value RV using the network key KN; and
      a content cryptographic module using said content key Kc or said random value RV as an encryption key for encrypting the content CT to obtain an encrypted content CT' that can be sent respectively with said random value RV or said content key Kc through said input/output interface to at least one of said devices acting as a receiving device, or each of said devices acting as a receiving device further including,
a third cryptographic module for at least one of,
generating said content key Kc by encrypting said random value RV using the network key KN, and
for recovering said random value RV from both the content key Kc and the network key KN and
a content cryptographic module using respectively said content key Kc or said random value RV as a decryption key for decrypting the encrypted content CT'.

9. The system of claim 8, wherein each of said devices comprises a single chip including said secure memory, said first cryptographic module, said second cryptographic module, said third cryptographic module and said content cryptographic module.

10. The system of claim 8, further comprising:
a non-volatile memory for storing data which do not require a high security level.

11. A device for securely transferring a content CT within a network, comprising:
at least one input/output interface for receiving and sending data,
a secure memory for storing a pre-initialized unique secret value S,
a first cryptographic module for generating a device key K from both said secret value S and a device value V received through said input/output interface,
a second cryptographic module for recovering a network key KN from both said device key K and an encrypted network key KN' received through said input/output interface,
a random value generator to generate a random value RV,
a third cryptographic module for generating content key Kc by encrypting said random value RV using the network key KN,
a content cryptographic module using said content key Kc or said random value RV as an encryption key for encrypting the content CT to obtain an encrypted content CT' that can be sent respectively with said random value RV or said content key Kc through said input/output interface.

12. A device for securely receiving a content CT within a network, comprising:
at least one input/output interface for receiving and sending data,
a secure memory for storing a pre-initialized secret value S,
a first cryptographic module for generating a device key K from both said secret value S and a device value V received through said input/output interface,
a second cryptographic module for recovering a network key KN from both said device key K and an encrypted network key KN' received through said input/output interface,
a third cryptographic module for at least one of,
generating a content key Kc by encrypting a random value RV, received input/output interface, using the network key KN, and
recovering said random value RV from both the network key KN and said content key Kc received through said input/output interface; and a content cryptographic module using respectively said content key Kc or said random value RV as a decryption key for decrypting the encrypted content CT'.

13. The device of claim 12, further comprising:
a single chip including said secure memory; said first cryptographic module, said second cryptographic module, said third cryptographic module and said content cryptographic module.

14. The device of claim 12, further comprising:
a non-volatile memory for storing data which do not require a high security level.

15. The device of claim 11, further comprising:
single chip including said secure memory, said first cryptographic module, said second cryptographic module, said third cryptographic module and said content cryptographic module.

16. The device of claim 11, further comprising:
a non-volatile memory for storing data which do not require a high security level.

17. A method for securely transferring a digital content CT between electronic devices within a network managed by a management center, each device comprising a pre-initialized unique secret value S, said method comprising:
an activation hale performed by the management center and including the steps,
generating a network key KN common to all of said devices,
calculating an encrypted network key KN' personalized for each device by encrypting said network key KN using a personal device key K which is different for each device, and
transmitting to each of said devices the encrypted network key KN' and a device value V resulting from a preliminary cryptographic operation encrypting the device key K belonging to said device using the unique secret value S of said device;
a keys recovering phase performed by each of said devices and including the steps,
performing a first cryptographic operation for obtaining the device key K from both the device value V and the secret value S of said device, and
performing a second cryptographic operation for obtaining the network key KN from both the encrypted network key KN' and the device key K; and
an operating phase performed at each device acting as a receiving device, including the steps,
receiving an encrypted content CT',
receiving at least one of a random value RV and a content key Kc,
performing a third cryptographic operation respectively for generating a content key Kc by encrypting said random value RV using the network key KN, or for retrieving a random value RV from both the network key KN and said content key Kc, and
decrypting the encrypted content CT' using respectively the content key Kc or the random value RV.

18. The method of claim 17, wherein said secret value S is implemented in a secure memory, located within a chip of the device, by a personalization authority.

19. The method of claim 18, wherein said preliminary cryptographic operation is performed by the personalization authority.

20. The method of claim 17, wherein the first, second and third cryptographic operations are performed with the encryption or decryption of the content CT within a single chip in the device.

* * * * *